(12) United States Patent
Nakajima et al.

(10) Patent No.: US 8,284,176 B2
(45) Date of Patent: Oct. 9, 2012

(54) DISPLAY DEVICE AND LUMINANCE CONTROL METHOD THEREFOR

(75) Inventors: Yoshiharu Nakajima, Kanagawa (JP); Takayuki Nakanishi, Kanagawa (JP); Natsuki Otani, Kanangawa (JP)

(73) Assignee: Sony Corporation, Tokyo (JP)

( * ) Notice: Subject to any disclaimer, the term of this patent is extended or adjusted under 35 U.S.C. 154(b) by 616 days.

(21) Appl. No.: 12/314,734

(22) Filed: Dec. 16, 2008

(65) Prior Publication Data
US 2009/0179880 A1    Jul. 16, 2009

(30) Foreign Application Priority Data
Jan. 15, 2008    (JP) .................................. 2008-005191

(51) Int. Cl.
*G09G 3/36*    (2006.01)
*G09G 5/00*    (2006.01)

(52) U.S. Cl. ............ 345/207; 345/87; 345/88; 345/690; 345/695; 349/116

(58) Field of Classification Search ............ 345/87–104, 345/204, 690, 695; 349/116
See application file for complete search history.

(56) References Cited

U.S. PATENT DOCUMENTS

| | | | |
|---|---|---|---|
| 2007/0152952 A1* | 7/2007 | Kang et al. ...................... 345/102 |
| 2007/0205415 A1* | 9/2007 | Hotta ................................ 257/72 |
| 2008/0191979 A1* | 8/2008 | Nakane et al. ................... 345/87 |
| 2008/0192237 A1* | 8/2008 | Yamamoto ....................... 356/73 |
| 2008/0198143 A1* | 8/2008 | Kinoshita et al. .............. 345/175 |
| 2009/0027319 A1* | 1/2009 | Chen ................................. 345/87 |
| 2009/0066897 A1* | 3/2009 | Katoh et al. .................... 349/116 |

FOREIGN PATENT DOCUMENTS

| | | |
|---|---|---|
| JP | 09-043627 A | 2/1997 |
| JP | 09-211457 A | 8/1997 |
| JP | 11-085395 A | 3/1999 |
| JP | 11-295692 | 10/1999 |
| JP | 2002-277872 A | 9/2002 |
| JP | 2003-043239 A | 2/2003 |
| JP | 2003-222851 A | 8/2003 |
| JP | 2004-020610 A | 1/2004 |
| JP | 2004-093670 A | 3/2004 |
| JP | 2005-070132 A | 3/2005 |
| JP | 2006-171683 A | 6/2006 |

(Continued)

OTHER PUBLICATIONS

Japanese Office Action issue Sep. 14, 2010 for corresponding Japanese Application No. 2008-005191.

(Continued)

*Primary Examiner* — Grant D Sitta
*Assistant Examiner* — Md Saiful A Siddiqui
(74) *Attorney, Agent, or Firm* — Rader Fishman & Grauer, PLLC

(57) ABSTRACT

Disclosed herein is a display device having an insulating substrate, an effective pixel area formed on the insulating substrate and having at least pixels arranged in the form of a matrix, and a peripheral circuit formed on the insulating substrate so as to surround the effective pixel area, the pixels being driven by the peripheral circuit to display a desired image in the effective pixel area, the display device including an extraneous light sensor provided in the effective pixel area for detecting extraneous light to output an extraneous light quantity detection result for use in controlling the luminance of the image.

9 Claims, 17 Drawing Sheets

FOREIGN PATENT DOCUMENTS

| | | |
|---|---|---|
| JP | 2006-267784 A | 10/2006 |
| JP | 2007-086265 A | 4/2007 |
| JP | 2007-212890 A | 8/2007 |
| JP | 2007-241303 A | 9/2007 |
| JP | 2007-310628 A | 11/2007 |
| JP | 2007-322830 | 12/2007 |
| JP | 2007-334313 A | 12/2007 |
| WO | WO-2005/057275 A1 | 6/2005 |
| WO | WO-2006/088118 A1 | 8/2006 |
| WO | WO 2006/117956 | 9/2006 |
| WO | 2006/117956 * | 11/2006 |

OTHER PUBLICATIONS

Japanese Office Action issued Nov. 17, 2009 for corresponding Japanese Application No. 2008-005191.

* cited by examiner

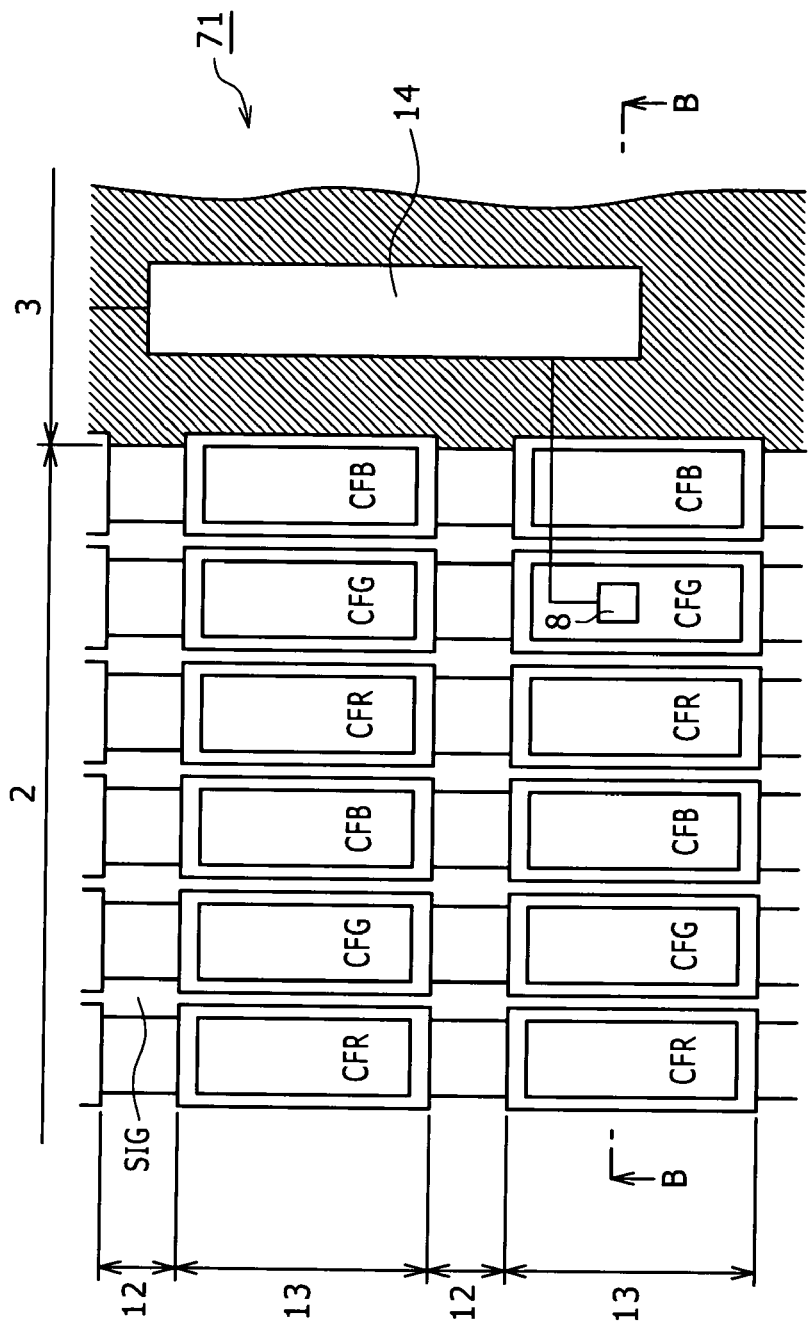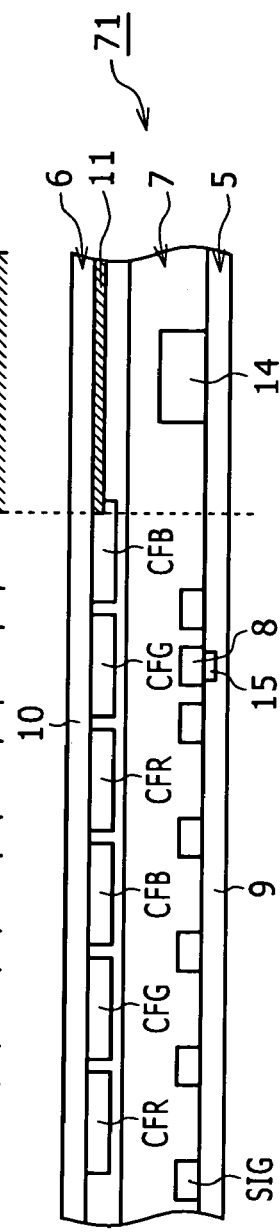
FIG. 7A
FIG. 7B

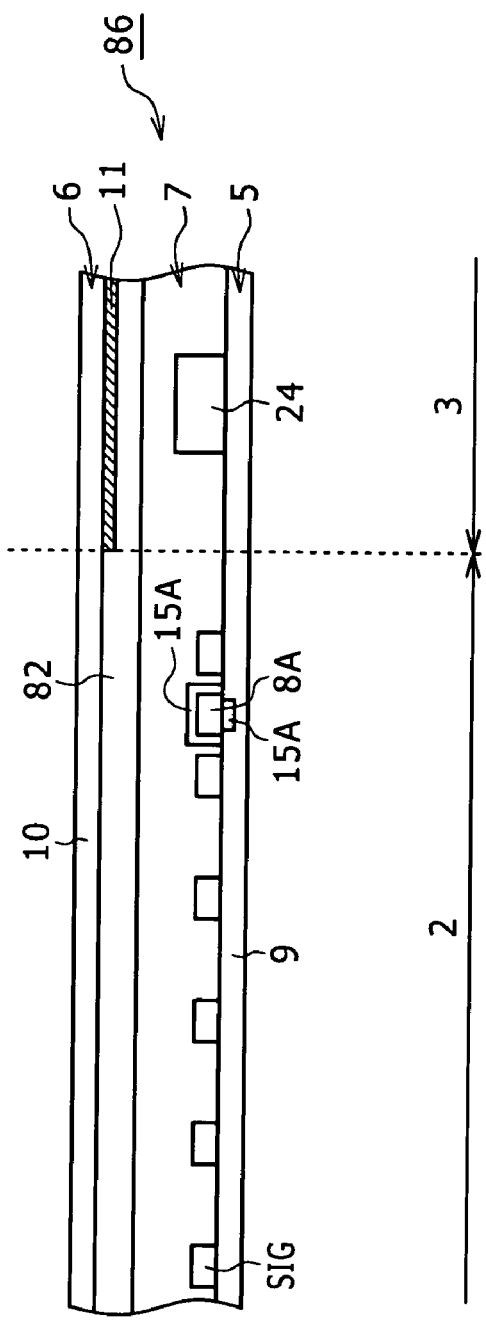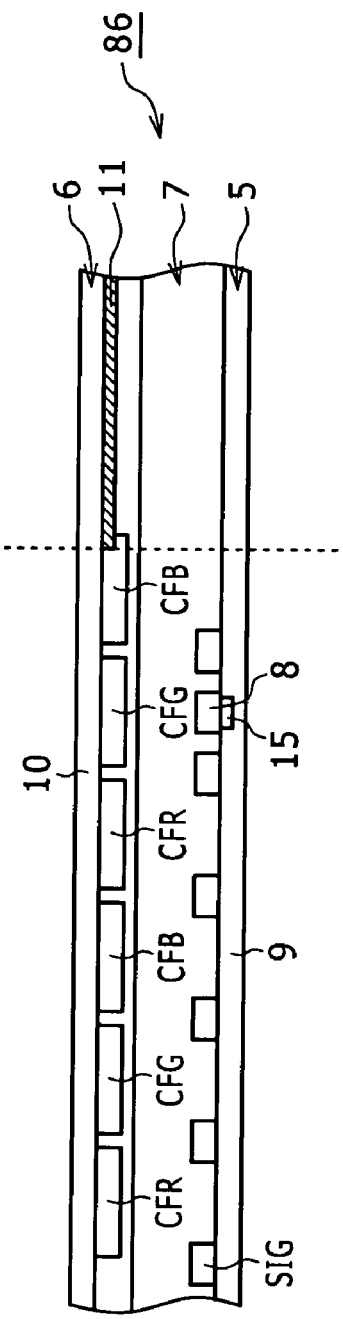

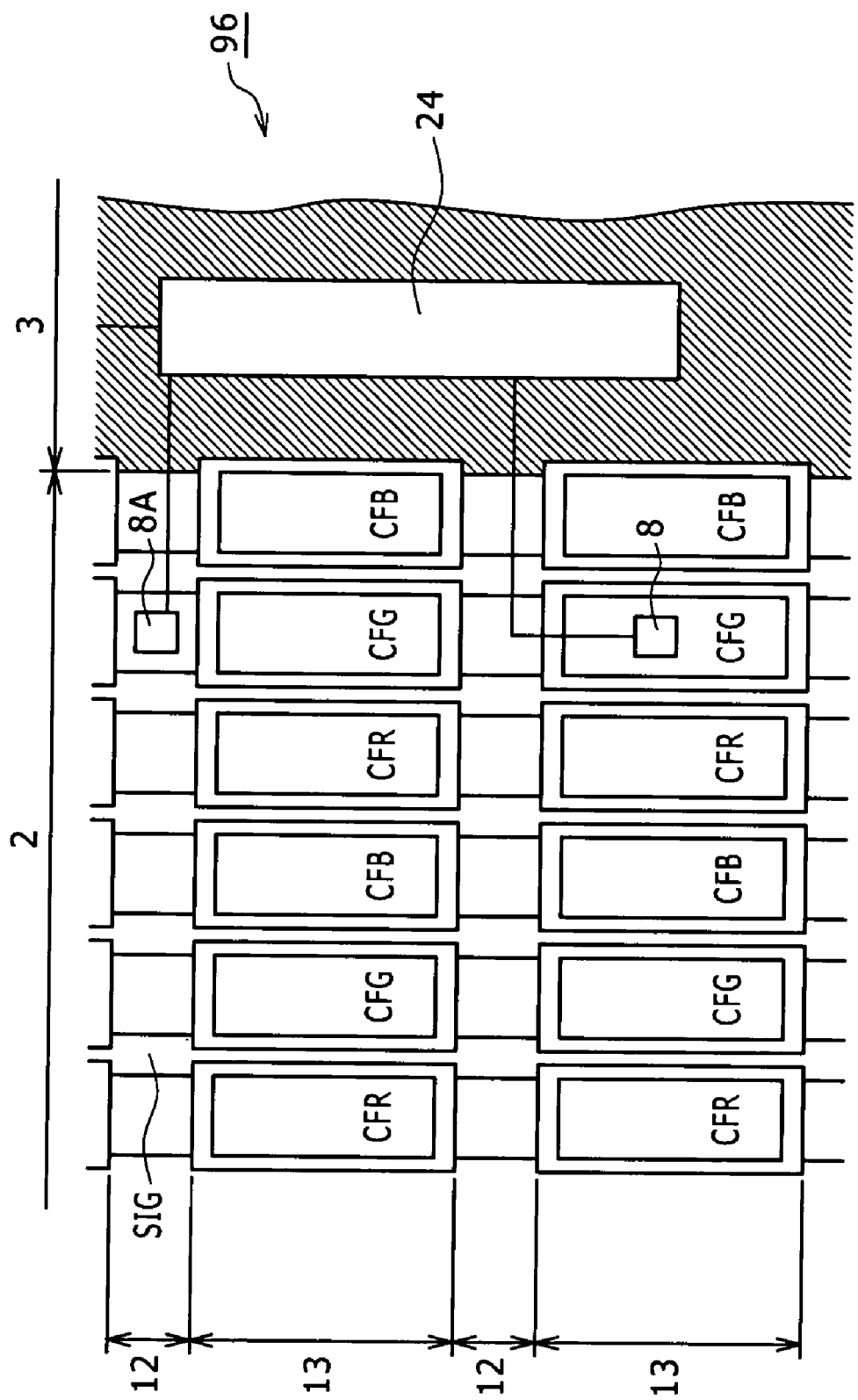

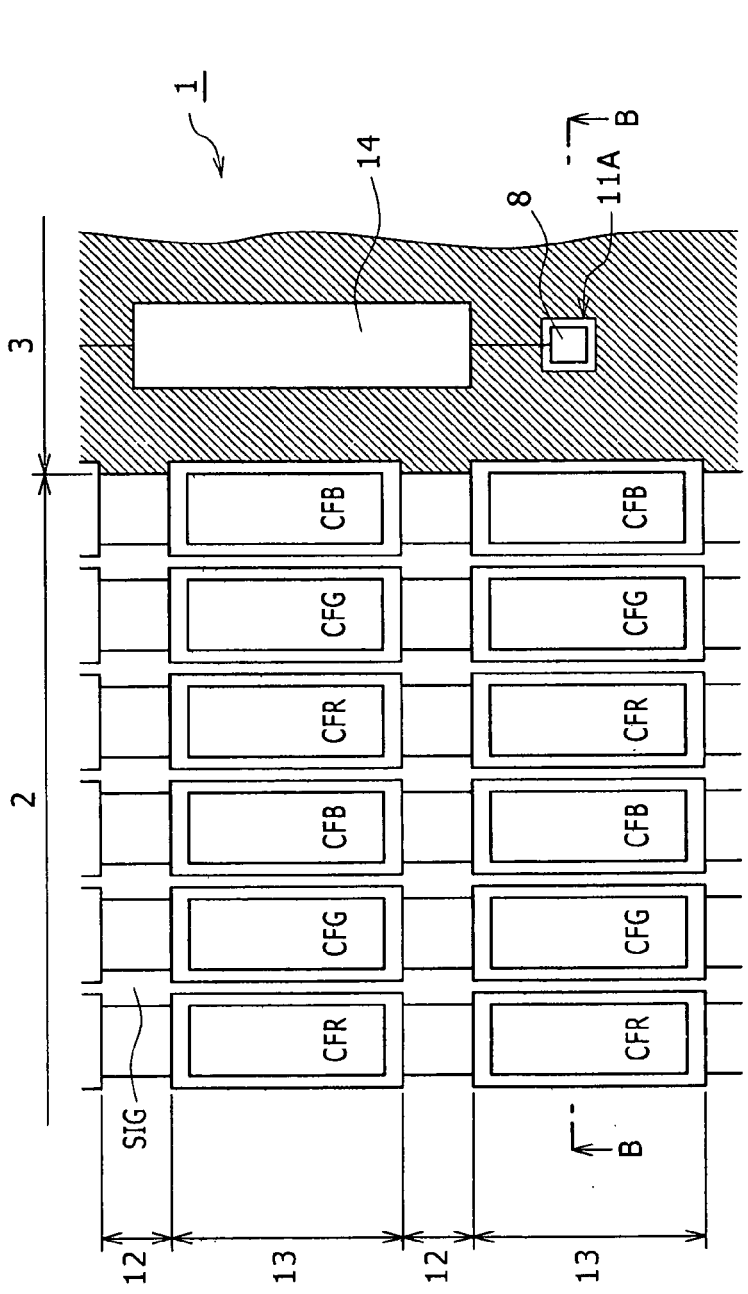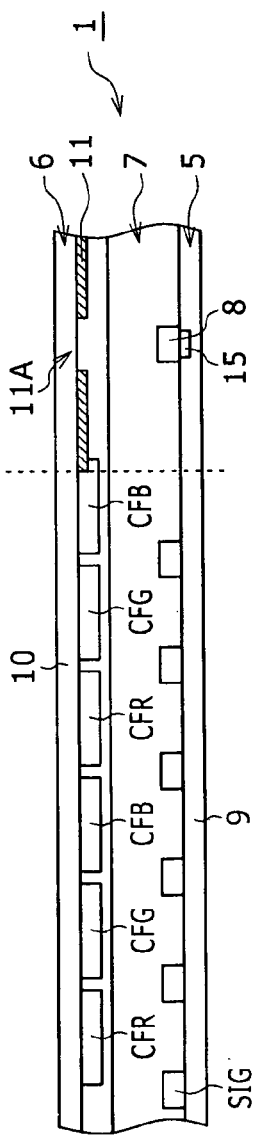
FIG.18A
Prior Art
FIG.18B
Prior Art

DISPLAY DEVICE AND LUMINANCE CONTROL METHOD THEREFOR

CROSS REFERENCES TO RELATED APPLICATIONS

The present invention contains subject matter related to Japanese Patent Application JP 2008-005191 filed in the Japan Patent Office on Jan. 15, 2008, the entire contents of which being incorporated herein by reference.

FIELD OF THE INVENTION

The present invention relates to a display device and a luminance control method therefor, and it is applicable to a liquid crystal display device, for example. The present invention includes an extraneous light sensor for detecting the quantity of extraneous light, wherein the extraneous light sensor is provided in an effective pixel area and luminance control is performed according to the detection result output from the extraneous light sensor, thereby performing the luminance control easily and accurately.

DESCRIPTION OF THE RELATED ART

In various display devices such as a liquid crystal display device known in the art, luminance control is performed according to the quantity of extraneous light. Particularly in a portable liquid crystal display device such as an electronic still camera and a mobile phone, luminance control is performed by controlling the luminance of light emitted from a backlight as disclosed in Japanese Patent Laid-Open No. Hei 11-295692, for example, thereby preventing undue power consumption and improving the visibility.

In such a liquid crystal display device, the quantity of extraneous light is detected by an extraneous light sensor as a photodetector for detecting extraneous light. For example, Japanese Patent Laid-Open No. 2007-322830 discloses a method of providing such an extraneous light sensor in a liquid crystal display panel.

FIG. 17 is a plan view of a liquid crystal display panel 1 applied to such a liquid crystal display device in the related art. The liquid crystal display panel 1 has an effective pixel area 2 in which pixels are arranged in the form of a matrix, and various images are displayed in the effective pixel area 2. The liquid crystal display panel 1 further has a light shielding area 3 surrounding the effective pixel area 2. The light shielding area 3 has a fixed width to thereby form a black frame surrounding the effective pixel area 2. The light shielding area 3 is surrounded by an outer area 4, and various drive circuits for driving the effective pixel area 2 are provided in the light shielding area 3 and the outer area 4. Further, a fixed portion along a given one side of the outer area 4 is assigned to an area 5 for external terminals to which electric power is supplied.

FIG. 18A is an enlarged plan view of a peripheral portion of the effective pixel area 2 shown by reference symbol A in FIG. 17, and FIG. 18B is a cross section taken along the line B-B in FIG. 18A. As shown in FIG. 18B, a liquid crystal layer 7 is sandwiched between a TFT (Thin Film Transistor) substrate 5 and a CF substrate 6. The TFT substrate 5 is composed of a glass substrate 9 as a transparent insulating substrate, a TFT (Thin Film Transistor) constituting each pixel, drive circuit, etc., an extraneous light sensor 8, signal lines SIGs, an alignment layer, etc. These TFTs, the extraneous light sensor 8, the signal lines SIGs, and the alignment layer are formed on the glass substrate 9. On the other hand, the CF substrate 6 is composed of a glass substrate 10 as a transparent glass substrate, red color filters CFRs, green color filters CFGs, blue color filters CFBs, an alignment layer, etc. These color filters CFRs, CFGs, and CFBs and the alignment layer are formed on the glass substrate 10. Further, a light shielding film 11 forming the light shielding area 3 is formed on the glass substrate 10.

The liquid crystal display panel 1 shown in FIGS. 18A and 18B is a semitransmissive liquid crystal display panel such that each pixel has a reflective display area 12 functioning as a reflective liquid crystal display panel and a transmissive display area 13 functioning as a transmissive liquid crystal display panel. The color filters CFRs, CFGs, and CFBs are provided in merely the transmissive display area 13, and the reflective display area 12 is utilized merely to compensate for the luminance level in the transmissive display area 13. Accordingly, the reflective display area 12 is smaller in size than the transmissive display area 13.

The extraneous light sensor 8 is provided in the light shielding area 3 at a position close to the effective pixel area 2. Further, a sensor circuit 14 for processing the detection result output from the extraneous light sensor 8 is provided in the light shielding area 3 at a position close to the extraneous light sensor 8. Various photodetectors such as a phototransistor and a photodiode may be used as the extraneous light sensor 8. A light shielding film 15 for shielding light from a backlight is formed on the lower surface of the extraneous light sensor 8 opposed to the glass substrate 9. Further, the light shielding film 11 of the CF substrate 6 is formed with an opening 11A for allowing the entry of extraneous light into the extraneous light sensor 8.

The sensor circuit 14 is provided by an integrating circuit for integrating an output signal from the extraneous light sensor 8 at given time intervals for a given integration time in synchronism with the operation of the effective pixel area 2. An output signal from the sensor circuit 14 is supplied to an external circuit to thereby detect the quantity of extraneous light entering the extraneous light sensor 8. The backlight is controlled so that the quantity of light from the backlight is increased with an increase in quantity of extraneous light.

In contrast to FIGS. 18A and 18B, FIGS. 19A and 19B show another liquid crystal display panel 21 known in the art. The liquid crystal display panel 21 has a correcting sensor 8A in addition to the extraneous light sensor 8, wherein the detection result output from the extraneous light sensor 8 is corrected by using an output signal from the correcting sensor 8A. The correcting sensor 8A has the same configuration as that of the extraneous light sensor 8 except that the correcting sensor 8A is prevented from detecting the light from the backlight and the extraneous light. Specifically, the correcting sensor 8A is provided by a photodetector having substantially the same characteristics as those of the extraneous light sensor 8. More specifically, the correcting sensor 8A is provided by a photodetector having the same configuration, shape, and size as those of the extraneous light sensor 8, and is located close to the extraneous light sensor 8. The correcting sensor 8A is configured so as not to detect the light from the backlight and the extraneous light. Accordingly, a light shielding film 15A for shielding the light from the backlight is formed on the lower surface of the correcting sensor 8A as in the case of the extraneous light sensor 8, and a light shielding member 15B for shielding the extraneous light from the opening 11A is provided to fully cover the correcting sensor 8A.

The liquid crystal display panel 21 has a sensor circuit 24 in place of the sensor circuit 14. The sensor circuit 24 subtracts the output signal from the correcting sensor 8A from the output signal from the extraneous light sensor 8, thereby preventing variations in the detection result due to dark current in the extraneous light sensor 8. This subtraction of the output signal from the correcting sensor 8A may be performed before integrating the output signal from the extraneous light sensor 8. Alternatively, this subtraction may be performed after integrating the output signal from the correcting sensor 8A and the output signal from the extraneous light sensor 8.

In contrast to FIGS. 17A and 17B and FIGS. 18A and 18B, FIGS. 20A and 20B show a display device 31 known in the art. The display device 31 has a case 32 formed with a rectangular opening 32A. The liquid crystal display panel 1 or 21 is provided on the inside surface of the case 32 so as to close the opening 32A. The size of the opening 32A is set so that the effective pixel area 2 can be seen through the opening 32A, that extraneous light can enter the extraneous light sensor 8 through the opening 32A, and that the outer area 4 surrounding the light shielding area 3 and the area 5 for the external terminals can be concealed by the case 32. Further, the case 32 is provided with a guide or the like for defining the mounting position of the liquid crystal display panel 1 or 21.

Accordingly, the effective pixel area 2 is formed inside the opening 32A in such a manner that an inner edge portion of the black frame formed by the light shielding area 3 has a fixed width D.

It is desired to reduce the size of the display device 31. Accordingly, the width D of the black edge portion to be seen through the opening 32A has to be reduced. Further, in the case that the width D of the black edge portion is large, the appearance of the display screen is poor. Also from this point of view, the width D of the black edge portion has to be reduced. To this end, the size of the opening 32A has to be minimized.

In the display device 31, however, the occurrence of mounting error of the liquid crystal display panel 1 or 21 to the case 32 may not be avoided, so that the reduction in size of the opening 32A may cause the interference with the entrance of extraneous light into the extraneous light sensor 8. Specifically, if the size of the opening 32A is reduced and the mounting error of the liquid crystal display panel 1 or 21 is large, there arises a problem such that the opening 11A of the light shielding film 11 is covered with the case 32 or a problem such that the extraneous light entering the extraneous light sensor 8 is blocked by the thickness of the case 32. In these cases, the entrance of the extraneous light into the extraneous light sensor 8 is impaired. Further, there also arises a problem such that the extraneous light is reflected on an end surface 32D of the case 32 defining the opening 32A and then enters the extraneous light sensor 8. As a result, scattered light may enter the extraneous light sensor 8, causing the entrance of excess amounts of extraneous light into the extraneous light sensor 8.

In such a case that the entrance of extraneous light into the extraneous light sensor 8 is impaired or excess amounts of extraneous light enter the extraneous light sensor 8, it is difficult to accurately control the luminance in the liquid crystal display device 31.

As a method of solving this problem, it is considered to improve the mounting accuracy of the liquid crystal display panel 1 or 21. However, this method may cause a problem such that the assembly of the display device 31 becomes troublesome.

SUMMARY OF THE INVENTION

It is accordingly an aim of the embodiments of the present invention to provide a display device and a luminance control method therefor which can perform luminance control easily and accurately.

In accordance with a mode of the present invention, there is provided a display device having an insulating substrate, an effective pixel area formed on the insulating substrate and having at least pixels arranged in the form of a matrix, and a peripheral circuit formed on the insulating substrate so as to surround the effective pixel area, the pixels being driven by the peripheral circuit to display a desired image in the effective pixel area, the display device including an extraneous light sensor provided in the effective pixel area for detecting extraneous light to output an extraneous light quantity detection result for use in controlling the luminance of the image.

In accordance with another mode of the present invention, there is provided a luminance control method for a display device having an insulating substrate, an effective pixel area formed on the insulating substrate and having at least pixels arranged in the form of a matrix, and a peripheral circuit formed on the insulating substrate so as to surround the effective pixel area, the pixels being driven by the peripheral circuit to display a desired image in the effective pixel area, the luminance control method including the steps of detecting step of detecting extraneous light by using an extraneous light sensor provided in the effective pixel area and outputting an extraneous light quantity detection result for use in controlling the luminance of the image; and controlling the luminance of the image according to the extraneous light quantity detection result.

According to the embodiments of the invention as described above, the extraneous light sensor is provided in the effective pixel area. Accordingly, it is possible to effectively avoid the problem that the entrance of extraneous light into the extraneous light sensor is impaired by the case or the like as in the case where the extraneous light sensor is provided outside the effective pixel area. As a result, the mounting operation can be easily performed and the luminance of the image can be controlled easily and accurately.

According to the embodiments of the present invention, luminance control can be performed easily and accurately.

Other aims and features of the embodiments of the invention will be more fully understood from the following detailed description and appended claims when taken with the accompanying drawings.

BRIEF DESCRIPTION OF THE DRAWINGS

FIGS. 7A and 7B are a plan view and a sectional view, respectively, showing a liquid crystal display panel applied to the display device shown in FIGS. 1A and 1B;

FIGS. 13A and 13B are sectional views of the liquid crystal display panel shown in FIG. 12;

FIG. 16 is a plan view showing a liquid crystal display panel applied to a display device according to a sixth preferred embodiment of the present invention;

FIGS. 18A and 18B are a plan view and a sectional view, respectively, showing the detail of the liquid crystal display panel shown in FIG. 17;

DETAILED DESCRIPTION OF THE PREFERRED EMBODIMENTS

Some preferred embodiments of the present invention will now be described with reference to the drawings.

Figure 2A:
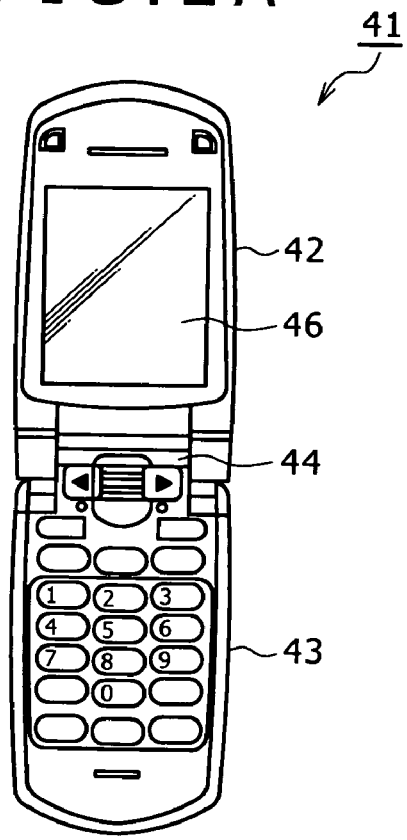
FIGS. 2A and 2B are plan views showing an example of the display device shown in FIGS. 1A and 1B.
Figure 2B:
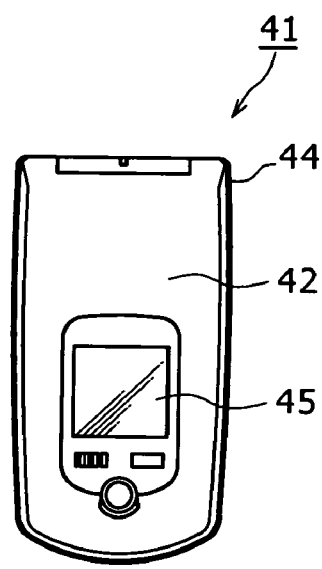

First Preferred Embodiment (1) Constitution of the First Preferred Embodiment FIGS. 2A and 2B are plan views of a mobile phone 41 as a display device according to the first preferred embodiment of the present invention. FIG. 2A shows an open condition of the mobile phone 41, and FIG. 2B shows a folded condition of the mobile phone 41. The mobile phone 41 is composed of an upper body portion 42, a lower body portion 43, and a connecting portion 44 for connecting the upper body portion 42 and the lower body portion 43 so that the upper body portion 42 is foldable with respect to the lower body portion 43. As shown in FIG. 2B, the upper body portion 42 of the mobile phone 41 is provided with an auxiliary display portion 45 capable of indicating various kinds of information to a user in the folded condition of the mobile phone 41. Further, as shown in FIG. 2A, the upper body portion 42 is provided with a main display portion 46 capable of indicating various kinds of information to the user in the open condition of the mobile phone 41. The constitution of the embodiments of the present invention is applicable to the main and auxiliary display portions 46 and 45 of the mobile phone 41.

Figure 3:
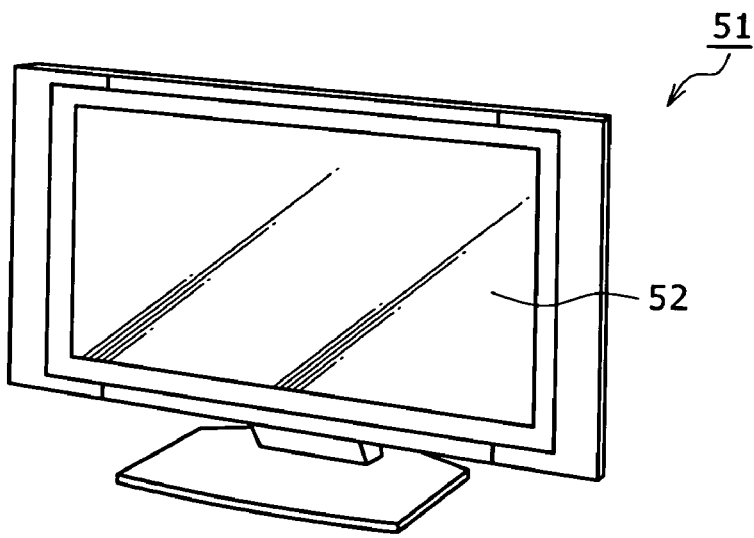
FIG. 3 is a perspective view showing another example of the display device shown in FIGS. 1A and 1B.

The constitution of the embodiments of the present invention is applicable widely to various electronic equipment having a display portion for displaying various images and information as well as to such a mobile phone. FIGS. 3 to 6 show other examples of electronic equipment to which the constitution of the embodiments of the present invention is applied. FIG. 3 is a perspective view of a television receiver 51. The television receiver 51 is provided with a display portion 52 on the front side. The constitution of the embodiments of the present invention is applied to the display portion 52 of the television receiver 51.

Figure 4A:
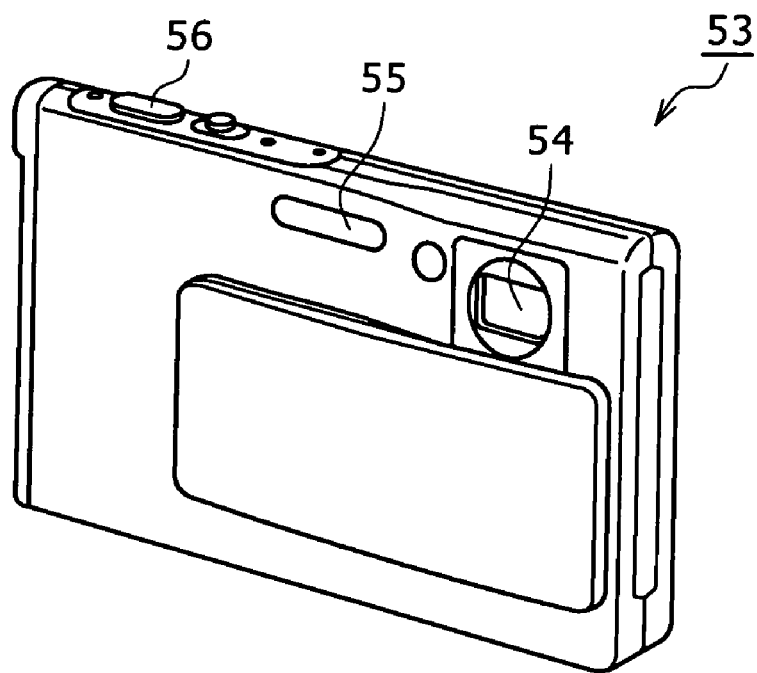
FIGS. 4A and 4B are perspective views showing another example of the display device shown in FIGS. 1A and 1B, which is different from the example shown in FIG. 3.
Figure 4B:
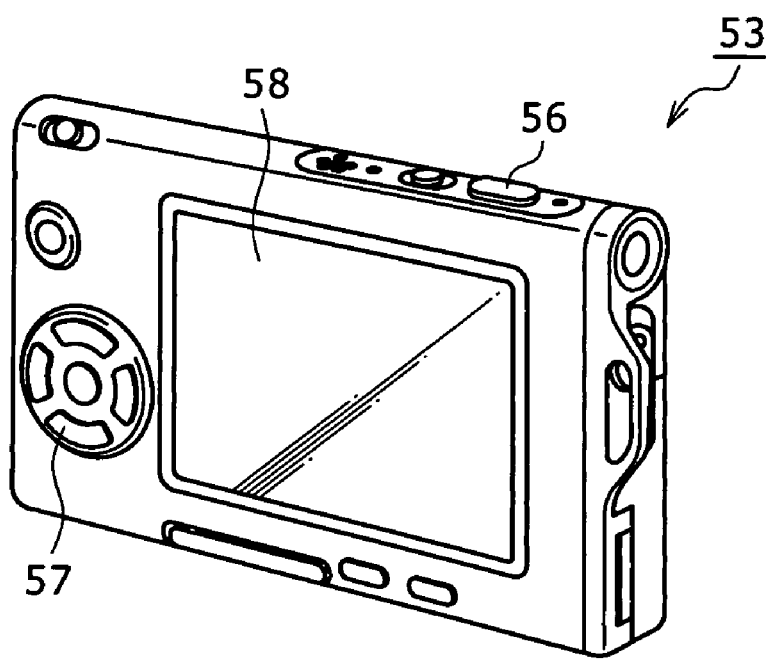

FIG. 4A is a perspective view of an electronic still camera 53 as viewed from the front side thereof, and FIG. 4B is a perspective view of the electronic still camera 53 as viewed from the rear side thereof. The front side of the electronic still camera 53 is provided with a lens 54 and a light emitting portion 55 for flash light emission. A shutter button 56 is provided on the upper end surface of the electronic still camera 53. Further, the rear side of the electronic still camera 53 is provided with a menu switch 57 and a display portion 58. The constitution of the embodiments of the present invention is applied to the display portion 58 of the electronic still camera 53.

Figure 5:
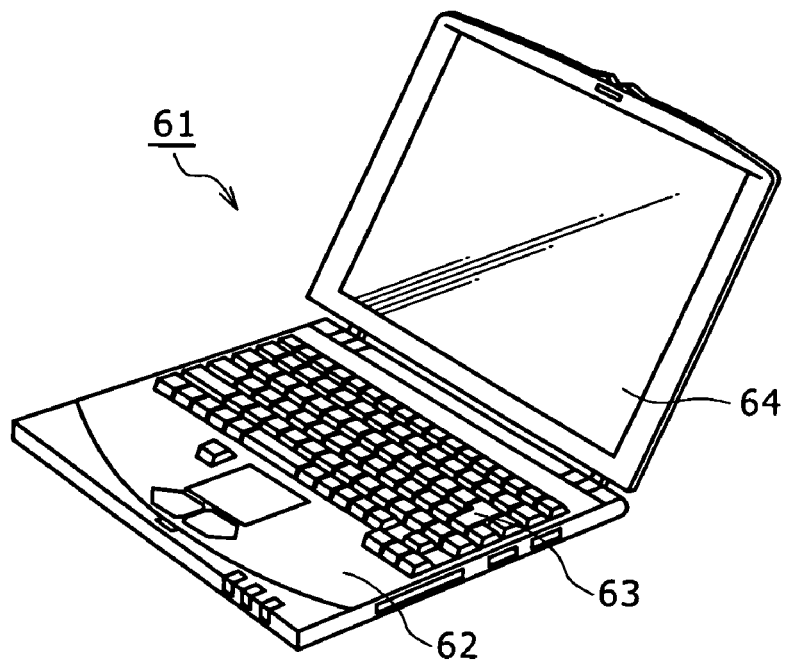
FIG. 5 is a perspective view showing another example of the display device shown in FIGS. 1A and 1B, which is different from the examples shown in FIGS. 3, 4A, and 4B.

FIG. 5 is a perspective view of a notebook personal computer 61. The notebook personal computer 61 is composed of a body portion 62 and a cover portion for covering the body portion 62. The body portion 62 is provided with a keyboard 63, and the cover portion is provided with a display portion 64. The constitution of the embodiments of the present invention is applied to the display portion 64 of the notebook personal computer 61.

Figure 6:
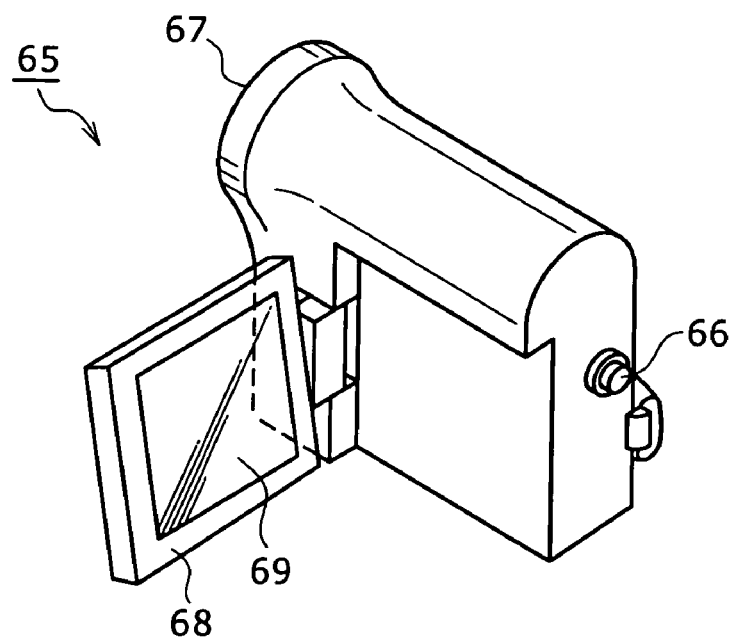
FIG. 6 is a perspective view showing another example of the display device shown in FIGS. 1A and 1B, which is different from the examples shown in FIGS. 3 to 5.

FIG. 6 is a perspective view of a video camera 65. The rear end surface of the video camera 65 is provided with a trigger switch 66, and the front end surface of the video camera 65 is provided with a lens 67. Further, the left side surface of the video camera 65 is provided with a pivotably movable door 68. The inside surface of the pivotably movable door 68 is provided with a display portion 69. The constitution of the embodiments of the present invention is applied to the display portion 69 of the video camera 65.

Figure 1A:
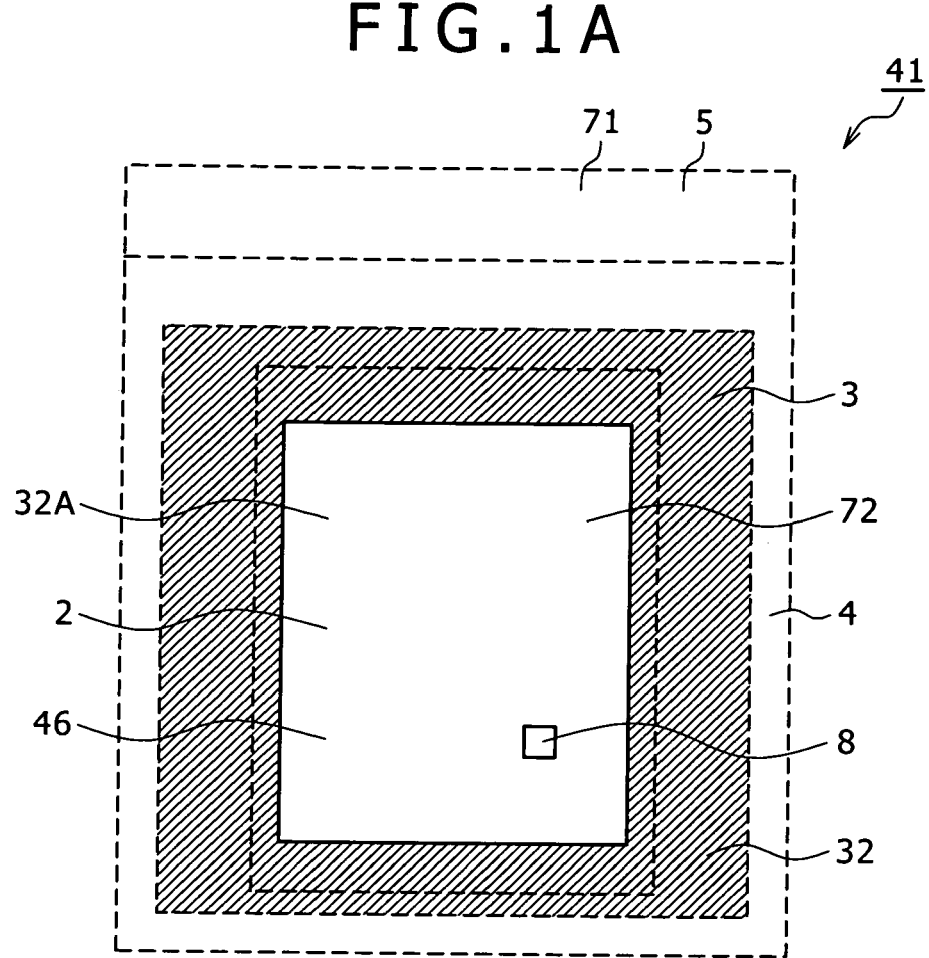
FIGS. 1A and 1B are a plan view and a sectional view, respectively, showing a display device according to a first preferred embodiment of the present invention.
Figure 1B:
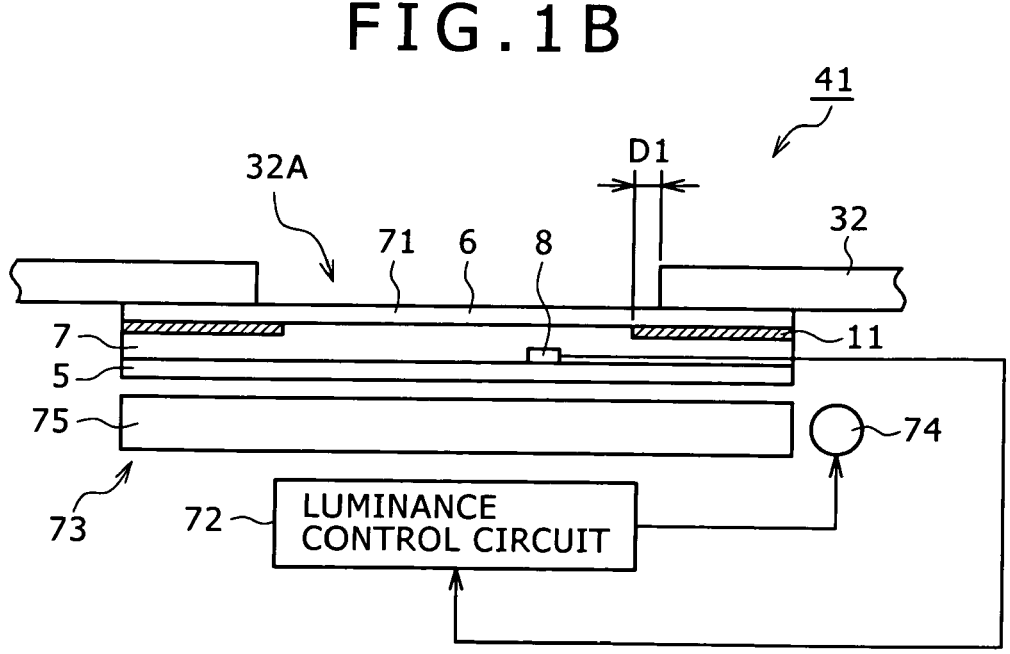

In contrast to FIGS. 20A and 20B, FIGS. 1A and 1B are a plan view and a sectional view, respectively, showing the constitution of a display device applied to such electronic equipment as mentioned above. In FIGS. 1A and 1B, the main display portion 46 of the mobile phone 41 as a display device shown in FIGS. 2A and 2B is illustrated. However, the auxiliary display portion 45 of the mobile phone 41 and the display portions of the other kinds of electronic equipment are constituted like the main display portion 46. Further, in FIGS. 1A and 1B, the same reference numerals as those shown in FIGS. 20A and 20B denote the same parts, and the description thereof will be omitted herein.

The display portion 46 of the display device 41 is provided with a liquid crystal display panel 71. The liquid crystal display panel 71 has the same configuration as that of the liquid crystal display panel 1 shown in FIGS. 20A and 20B except that the extraneous light sensor 8 is provided in the effective pixel area 2. Accordingly, the opening 32A of the case 32 of the liquid crystal display panel 71 is smaller than that of the liquid crystal display panel 1 by an amount corresponding to the location of the extraneous light sensor 8 in the effective pixel area 2 rather than in the light shielding area 3. As a result, the width D1 of the edge portion of the black frame surrounding the effective pixel area 2 in the display device 41 is smaller than the width D in the display device 31 shown in FIGS. 20A and 20B.

As shown in FIG. 1B, the display device 41 has a luminance control circuit 72 for controlling the luminance of light emitted from a primary light source 74 provided in a backlight unit 73 according to the light quantity detection result output from the extraneous light sensor 8 provided in the effective pixel area 2, thereby controlling the luminance of a display screen formed in the display portion 46. As shown in FIG. 1B, the backlight unit 73 includes a light guide plate 75. The primary light source 74 is provided by a light emitting diode or a cold cathode fluorescent tube, for example. The illumination light emitted from the primary light source 74 enters the light guide plate 75 from an end surface thereof to propagate inside the light guide plate 75 and to emerge from an upper surface of the light guide plate 75 opposed to the liquid crystal display panel 71. While the backlight unit 73 shown in FIG. 1B is a so-called edge light type backlight unit, a so-called direct type backlight unit may be adopted. In the case of adopting such a direct type backlight unit using a plurality of light emitting elements as the primary light source, the extraneous light sensor may be assigned to each light emitting element or to every predetermined number of light emitting elements, thereby controlling the light quantity of each light emitting element or of every predetermined number of light emitting elements.

While one extraneous light sensor 8 is provided in the effective pixel area 2 as shown in FIG. 1A, a plurality of extraneous light sensors 8 are actually provided at discrete positions in the effective pixel area 2 of the display device 41. Output signals from these plural extraneous light sensors 8 are added up and processed to thereby improve the SN (signal noise) ratio and signal level of the light quantity detection result. The processing of the output signals from the extraneous light sensors 8 may be performed by simply adding up the output signals from the extraneous light sensors 8 or by weighting the output signals from the extraneous light sensors 8 with weighting factors according to the positions of the extraneous light sensors 8 prior to the addition step. However, merely one extraneous light sensor 8 may be provided if a practically sufficient SN ratio and signal level can be ensured.

In contrast to FIGS. 18A and 18B, FIGS. 7A and 7B show the specific position of the extraneous light sensor 8 in the liquid crystal display panel 71. As shown in FIGS. 7A and 7B, the extraneous light sensor 8 is located in a green pixel in the effective pixel area 2. The wavelength band of the green pixel is the most sensitive in human visual characteristics. Accordingly, the extraneous light sensor 8 is located so as to detect extraneous light through the green color filter CFG located in the green pixel in the liquid crystal display panel 71.

The extraneous light sensor 8 is provided in the transmissive display area 13 of the green pixel. While the extraneous light sensor 8 is provided in the green pixel close to the light shielding area 3 as shown in FIGS. 7A and 7B, the green pixel for location of the extraneous light sensor 8 may be suitably selected as desired. In the case that the extraneous light sensor 8 is provided in the green pixel close to the light shielding area 3 as shown, the connection line between the extraneous light sensor 8 and the sensor circuit 14 can be shortened as much as possible. Further, as shown in FIGS. 7A and 7B, a blue pixel is present outside of the green pixel in which the extraneous light sensor 8 is located. That is, the extraneous light sensor 8 is located in the green pixel adjacent to the outermost blue pixel. With this arrangement, extraneous light can be detected in the condition where the outermost pixel causing the occurrence of alignment defect most easily is avoided. Accordingly, it is possible to prevent a reduction in accuracy of measurement of an extraneous light quantity due to the alignment defect in the pixel where the extraneous light sensor 8 is located. Further, the extraneous light sensor 8 may be located inside of the outermost edge of the effective pixel area 2 by an amount equal to or greater than t×tan $\square$ where t is the thickness of the glass substrate 10 and $\square$ is the critical angle. In this case, even if the mounted position of the liquid crystal display panel 71 varies, it is possible to prevent that the extraneous light reflected on the wall surface of the case 32 forming the opening 32A may enter the extraneous light sensor 8. Further, the extraneous light sensor 8 may be located further inside of the outermost edge of the effective pixel area 2. In this case, it is possible to prevent that the extraneous light incident on the extraneous light sensor 8 may be blocked by the finger of the user operating various operation parts. Further, the extraneous light sensor 8 may be located at the center of the screen where the human visual perception to the brightness of the screen is made most easily, thereby improving the accuracy of luminance control.

(2) Operation of the First Preferred Embodiment

In the display device 41 shown in FIGS. 1A and 1B, the primary light source 74 of the backlight unit 73 is driven by the luminance control circuit 72, and the light emitted from the primary light source 74 is supplied through the light guide plate 75 to the liquid crystal display panel 71. In the liquid crystal display panel 71, the gray scale in each pixel is set according to image data or the like, and the light supplied from the backlight unit 73 is spatially modulated in the transmissive display area 13 of each pixel according to the gray scale set in each pixel, thereby displaying a desired image. In the reflective display area 12 of each pixel, extraneous light is spatially modulated in a similar manner to thereby display a desired image.

In the display device 41, the quantity of extraneous light is detected by the extraneous light sensor 8, and the detection result output from the extraneous light sensor 8 is processed by the sensor circuit 14 and input into the luminance control circuit 72. When the quantity of extraneous light is increased to cause the difficulty in viewing the display screen formed in the effective pixel area 2, the luminance control circuit 72 operates to increase the luminance of the light emitted from the primary light source 74, for example, in proportion to the quantity of extraneous light according to the light quantity detection result output from the extraneous light sensor 8, thereby increasing the luminance of the display screen. Accordingly, even when the quantity of extraneous light is increased, sufficient visibility can be ensured. Further, a large quantity of light is not unnecessarily emitted from the primary light source 74, thereby reducing power consumption.

Figure 17:
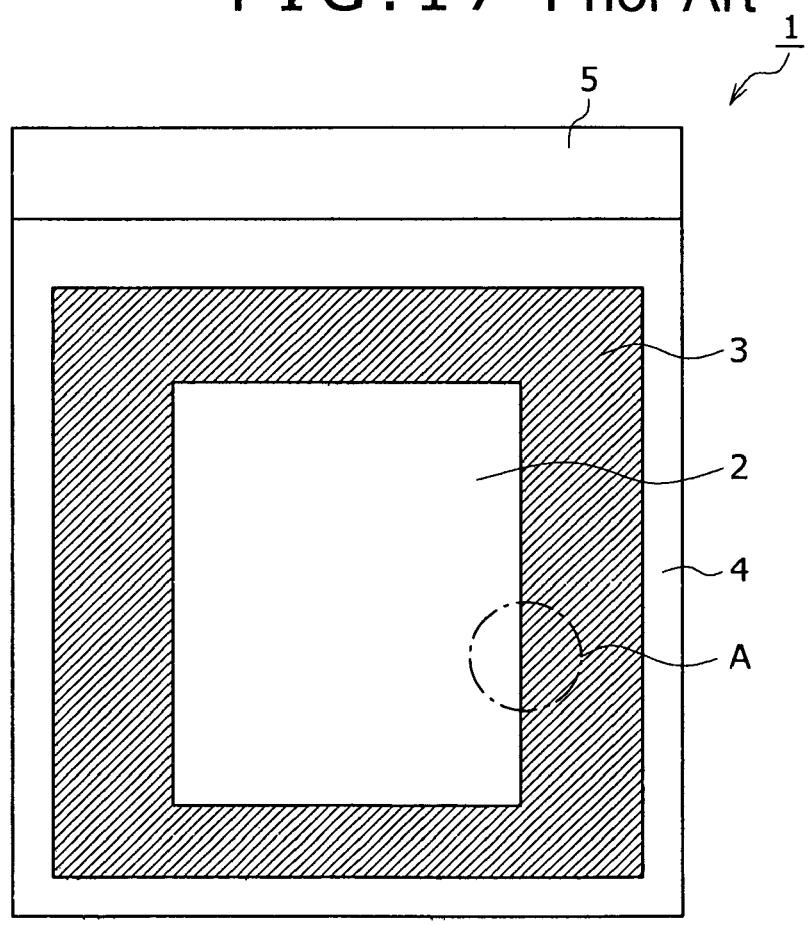
FIG. 17 is a plan view showing a liquid crystal display panel in the related art.
Figures 19A, 19B:
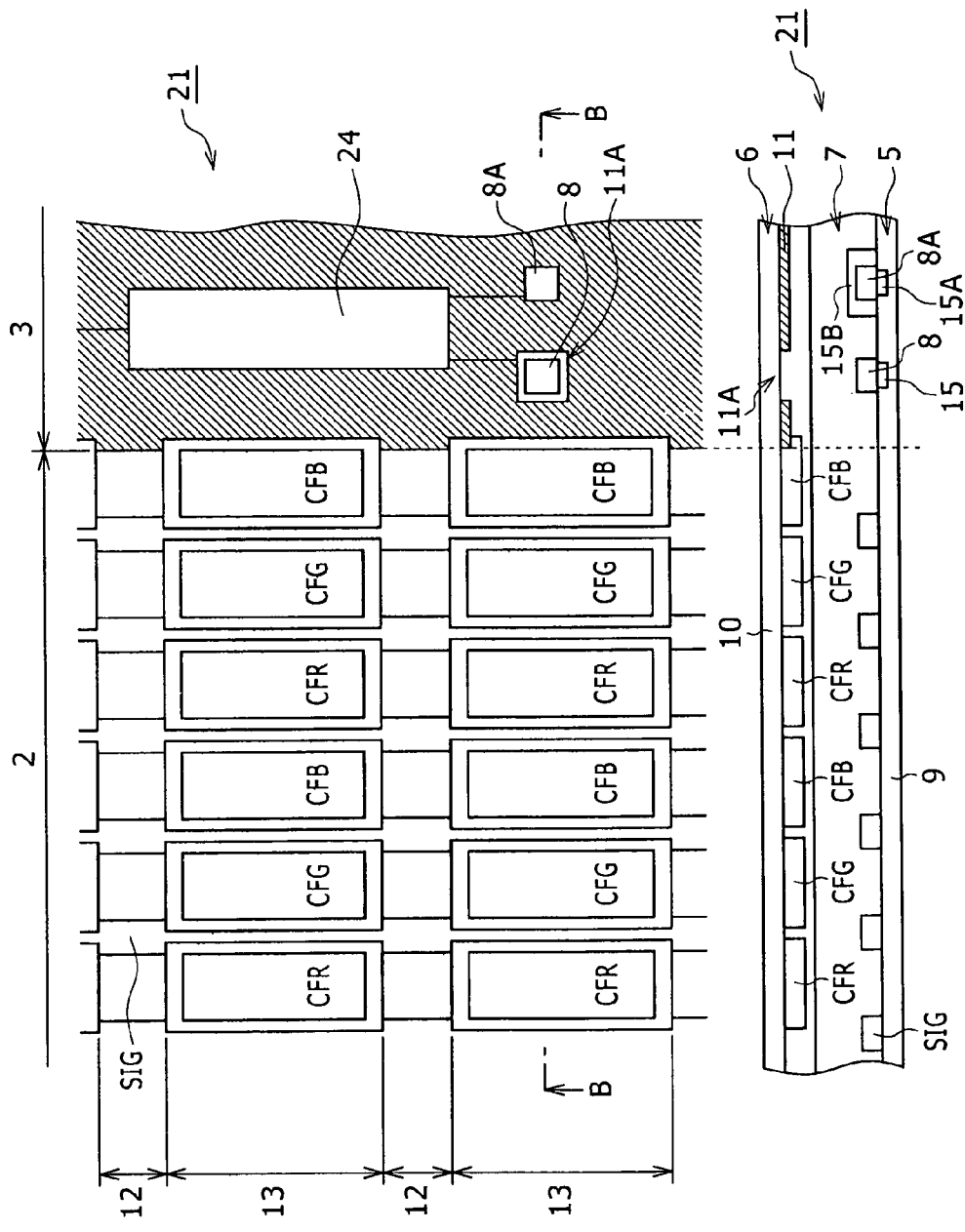
FIGS. 19A and 19B are a plan view and a sectional view, respectively, showing the detail of another liquid crystal display panel in the related art.
Figure 20A:
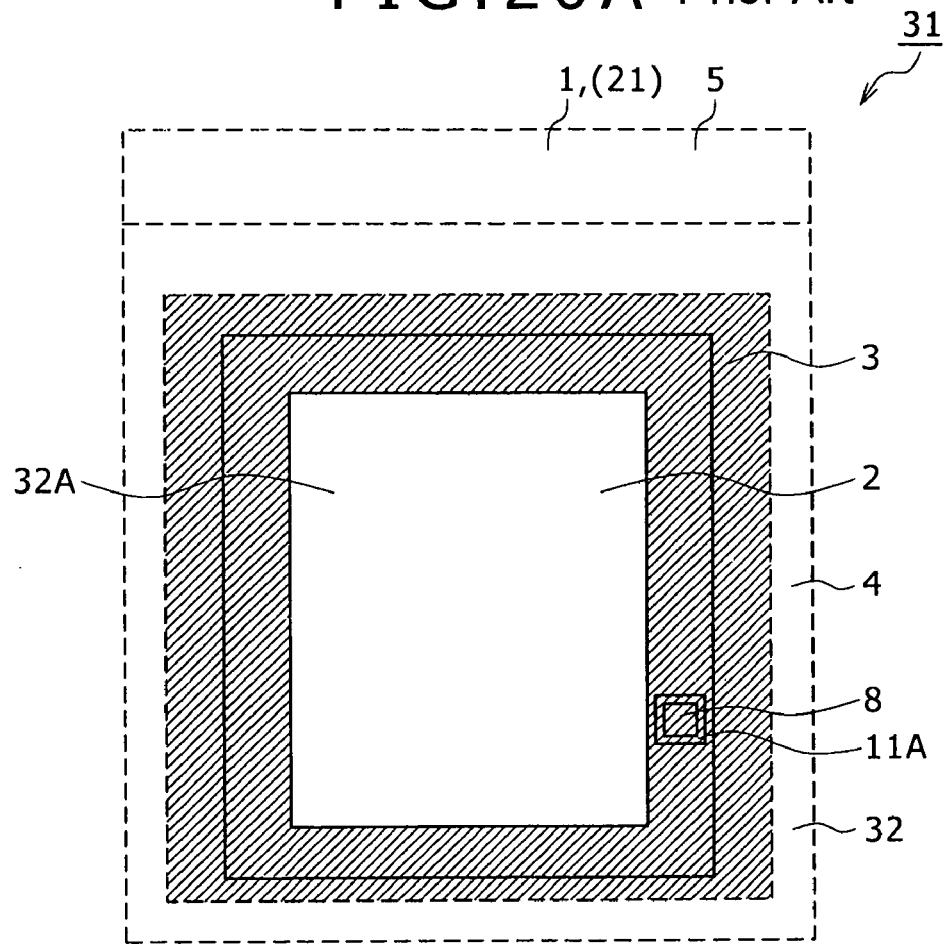
FIGS. 20A and 20B are a plan view and a sectional view, respectively, illustrating the layout of an extraneous light sensor in the liquid crystal display panel shown in FIG. 17.
Figure 20B:
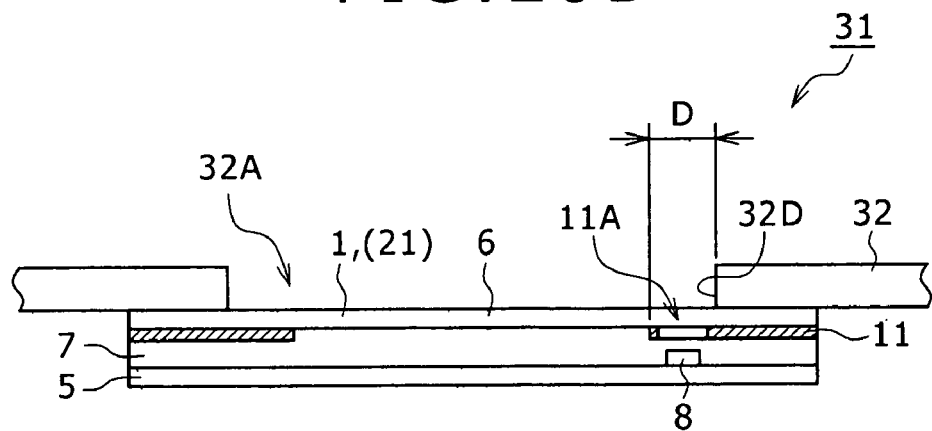

In the existing display device (see FIGS. 17, 20A, and 20B), the extraneous light sensor 8 is located in the light shielding area 3. In this structure, the opening 32A of the case 32 has to be increased in size so as not to block the extraneous light sensor 8. As a result, the width D of the edge portion of the black frame formed by the light shielding area 3 so as to surround the effective pixel area 2 is increased to cause a degradation in quality of the display screen. If the opening 32A is reduced in size to reduce the width D of the edge portion of the black frame, the extraneous light entering the extraneous light sensor 8 is reduced in quantity and reflected by the case 32 to undesirably enter the extraneous light sensor 8, so that the quantity of extraneous light may not be accurately detected. Accordingly, it is difficult to accurately control the luminance of the display screen in the display device. Further, high assembly accuracy is desired and the display device may not therefore be easily fabricated.

According to this preferred embodiment, the extraneous light sensor 8 is located in the effective pixel area 2 rather than in the light shielding area 3. With this arrangement, the opening 32A of the case 32 can be reduced in size to thereby reduce the width of the edge portion of the black frame on the display screen, thereby improving the quality of the display screen.

Further, the entrance of extraneous light into the extraneous light sensor 8 is not hindered in spite of the reduced width of the edge portion of the black frame, so that the quantity of extraneous light can be accurately detected. Accordingly, the accuracy of luminance control can be improved without high assembly accuracy. That is, the luminance can be controlled easily and accurately according to this preferred embodiment.

Further, the extraneous light sensor 8 is located in a green pixel in the effective pixel area 2, and extraneous light is detected through the green color filter CFG provided in the green pixel. The wavelength band of the green pixel is the most sensitive in human visual characteristics. Accordingly, the luminance can be controlled according to the human visual characteristics, so that the accuracy of luminance control can be improved.

Since the extraneous light sensor 8 is provided in the effective pixel area 2, the flexibility of layout of the extraneous light sensor 8 can be greatly improved as compared with the case that the extraneous light sensor 8 is provided in the light shielding area 3. Accordingly, various disturbances due to the location of the extraneous light sensor 8 such as scattered light from the case 32 and light shield by user operations can be avoided to reliably detect the extraneous light.

In the case that the extraneous light sensor 8 is provided in the effective pixel area 2, there is a possibility that the extraneous light sensor 8 may be visually perceived. However, by providing a plurality of extraneous light sensors 8 and adding up the output signals from these plural extraneous light sensors 8 to thereby improve the SN ratio and signal level, each extraneous light sensor 8 can be reduced in size so that it may not be visually perceived on the display screen. Further, since the extraneous light sensor 8 is provided in a pixel, the extraneous light sensor 8 can be made inconspicuous on the display screen.

(3) Effect of the First Preferred Embodiment

According to this preferred embodiment, the extraneous light sensor is located in the effective pixel area, so that the luminance can be controlled easily and accurately.

The extraneous light sensor is located in a pixel in the effective pixel area, so that the extraneous light sensor can be made inconspicuous on the display screen.

The extraneous light sensor is located in a green pixel, the quantity of extraneous light can be accurately detected according to the human visual characteristics.

The luminance can be controlled by the luminance control circuit according to the extraneous light quantity detection result output from the extraneous light sensor, so that the visibility can be improved with a reduction in power consumption.

The luminance control circuit controls the luminance by controlling the quantity of light emitted from the primary light source of the backlight unit, so that the luminance can be controlled in a liquid crystal display device.

Second Preferred Embodiment

In contrast to FIGS. 7A and 7B and FIGS. 19A and 19B, FIGS. 8A and 8B show a liquid crystal display panel 76 applied to a display device according to a second preferred embodiment of the present invention. The display device according to the second preferred embodiment includes the liquid crystal display panel 76 in place of the liquid crystal display panel 71 shown in FIGS. 7A and 7B.

Figure 8A:
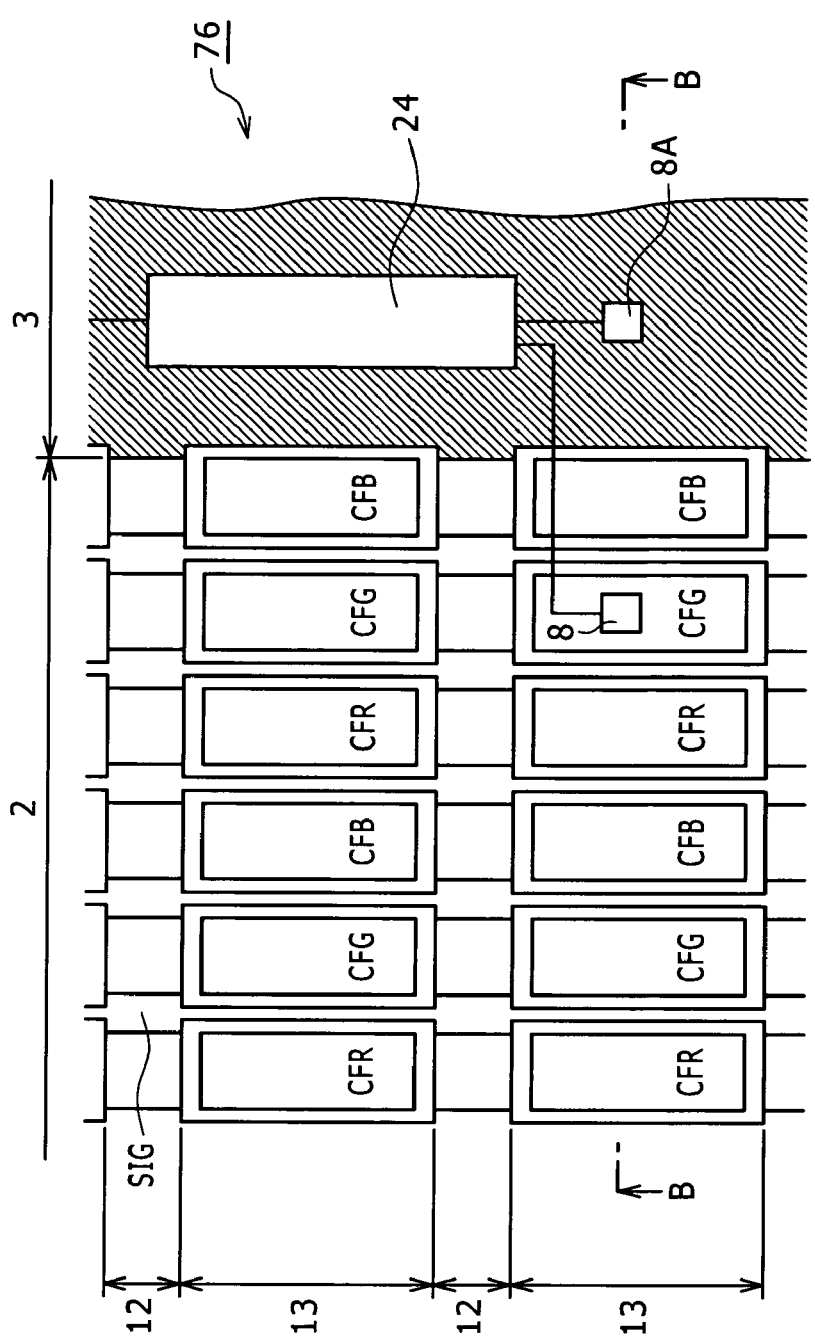
FIGS. 8A and 8B are a plan view and a sectional view, respectively, showing a liquid crystal display panel applied to a display device according to a second preferred embodiment of the present invention.
Figure 8B:
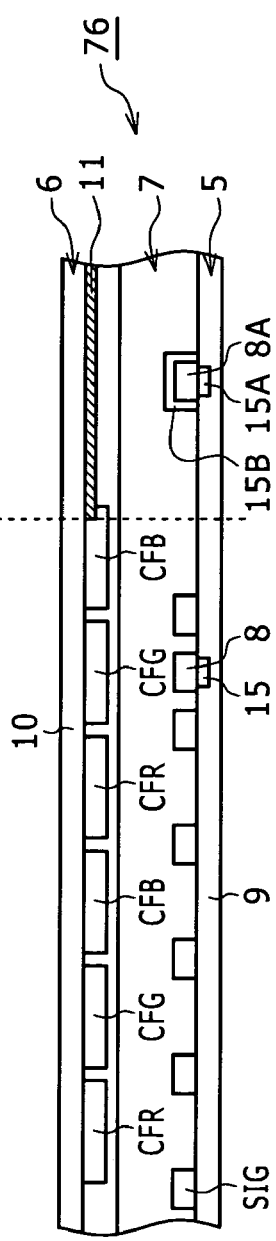
Figures 9A, 9B:
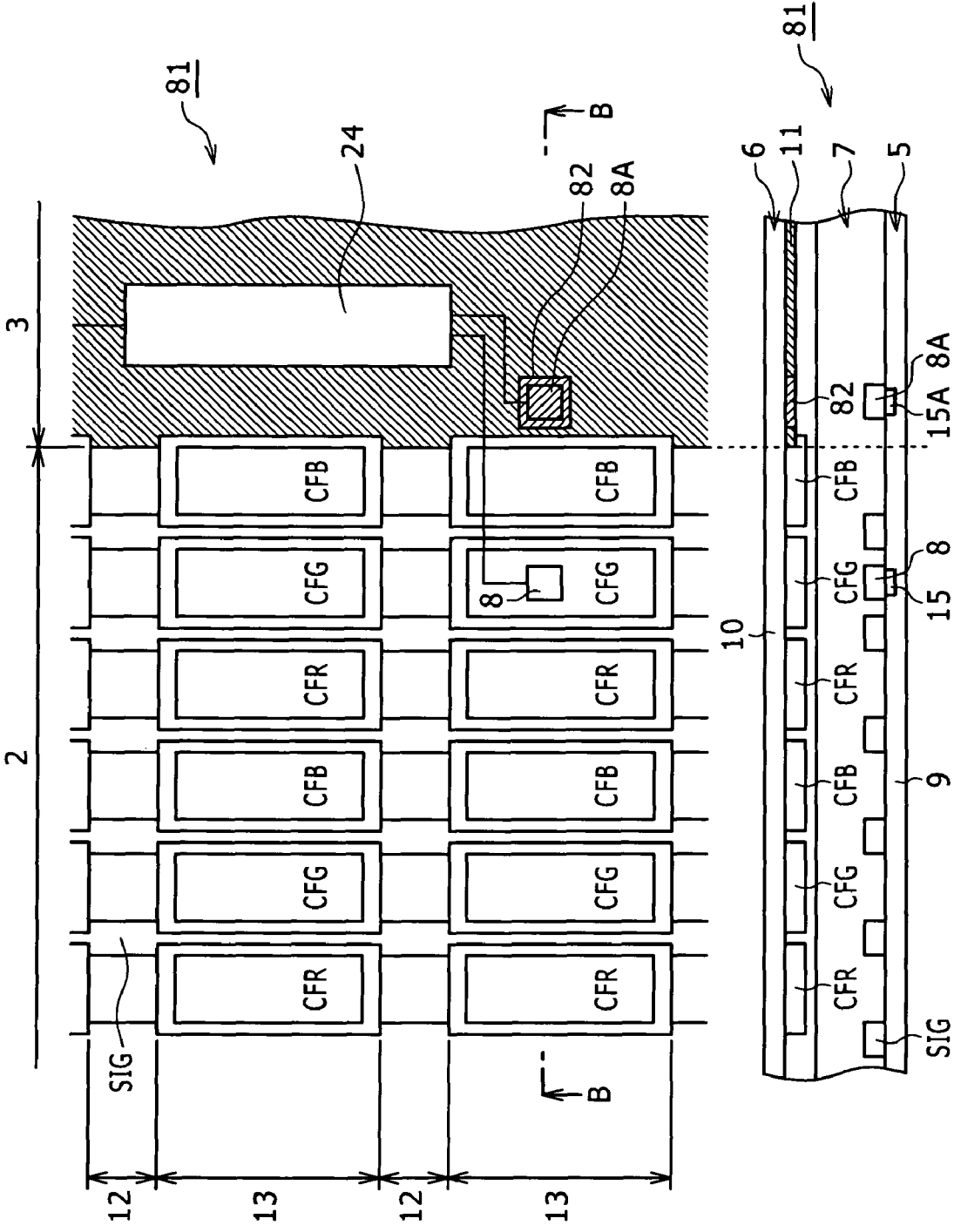
FIGS. 9A and 9B are a plan view and a sectional view, respectively, showing a liquid crystal display panel applied to a display device according to a third preferred embodiment of the present invention.

The liquid crystal display panel 76 according to the second preferred embodiment has the same configuration as that of the liquid crystal display panel 71 according to the first preferred embodiment except that a correcting sensor 8A is provided in the light shielding area 3 and that the output signal from the extraneous light sensor 8 is corrected by the output signal from the correcting sensor 8A prior to the luminance controlling step. The configuration of the correcting sensor 8A and the configuration of a sensor circuit 24 for processing the output signal from the correcting sensor 8A in the liquid crystal display panel 76 shown in FIGS. 8A and 8B are the same as those of the liquid crystal display panel 21 shown in FIGS. 19A and 19B. Actually, a plurality of correcting sensors 8A may be provided so as to respectively correspond to a plurality of extraneous light sensors 8, and the output signal from each correcting sensor 8A may be subtracted from the output signal from the corresponding extraneous light sensor 8, thereby canceling the influence of dark current. Further, one correcting sensor 8A may be assigned to every predetermined number of extraneous light sensors 8, and the output signals from these extraneous light sensors 8 may be corrected by the single correcting sensor 8A.

According to this preferred embodiment, dark current in the extraneous light sensor 8 can be corrected by using he correcting sensor 8A provided in the light shielding area 3, thereby improving the accuracy of luminance control as comparison with the first preferred embodiment.

Third Preferred Embodiment

In contrast to FIGS. 8A and 8B, FIGS. 9A and 9B show a liquid crystal display panel 81 applied to a display device according to a third preferred embodiment of the present invention. The display device according to the third preferred embodiment includes the liquid crystal display panel 81 in place of the liquid crystal display panel 71 shown in FIGS. 7A and 7B.

In the liquid crystal display panel 81, the correcting sensor 8A is located in the light shielding area 3 at a position close to the effective pixel area 2, and the light shielding member 15B shown in FIG. 8B is omitted to allow the correcting sensor 8A to detect extraneous light. Further, a part of the light shielding film 11 corresponding to the position of the correcting sensor 8A is replaced by a filter 82 capable of selectively transmitting a wavelength band of infrared radiation. That is, the correcting sensor 8A in the liquid crystal display panel 81 detects merely the wavelength band of infrared radiation included in the extraneous light. Thus, the liquid crystal display panel 81 according to the third preferred embodiment is different from the liquid crystal display panel 76 according to the second preferred embodiment in merely the configuration relating to the correcting sensor 8A.

As in the second preferred embodiment, a plurality of correcting sensors 8A may be provided so as to respectively correspond to a plurality of extraneous light sensors 8. Further, one correcting sensor 8A may be assigned to every predetermined number of extraneous light sensors 8. Further, a single correcting sensor 8A may be provided for all of the extraneous light sensors 8.

Figure 10:
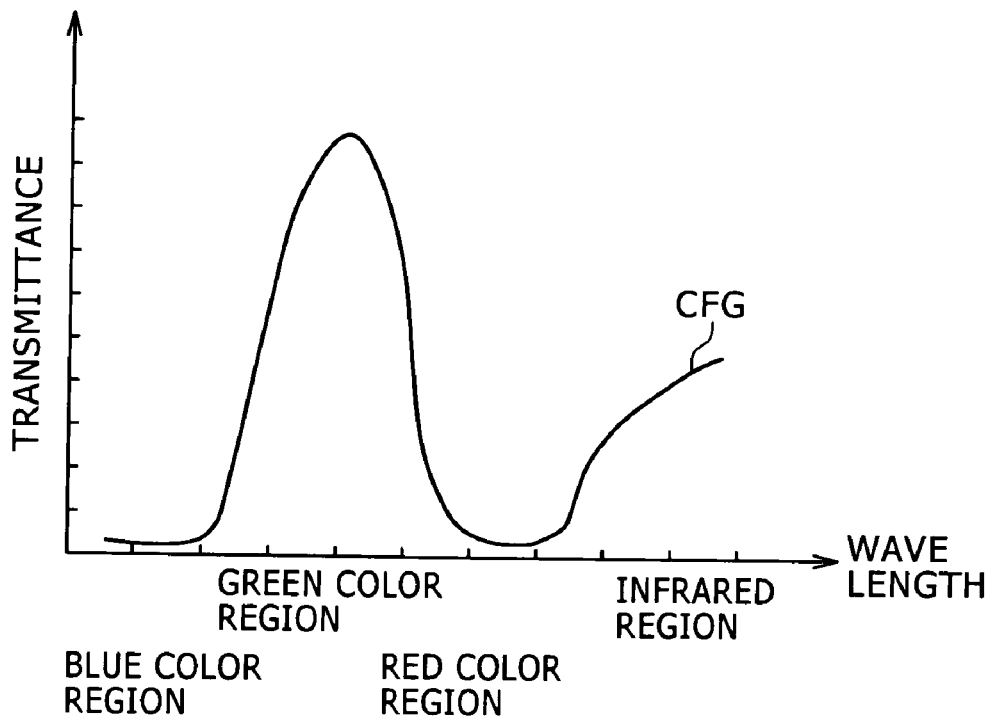
FIG. 10 is a graph showing the transmission characteristic of a green color filter.

FIG. 10 is a graph showing a characteristic curve of transmittance of the green color filter CFG. As shown in FIG. 10, in the human visible region, the transmittance of the green color filter CFG is increased in merely the green wavelength band and remarkably decreased in the red and blue wavelength bands. However, in the wavelength band of infrared radiation outside the visible region, the transmittance of the green color filter CFG is increased. Further, the extraneous light sensor 8 has a sufficient sensitivity to the wavelength band of infrared radiation. Accordingly, in the configurations of the first and second preferred embodiments, the extraneous light sensor 8 also detects infrared radiation.

In the second preferred embodiment, the output signal from the extraneous light sensor 8 is corrected by the correcting sensor 8A to correct for dark current in the extraneous light sensor 8. However, the detection result of infrared radiation may not be corrected by the correcting sensor 8A according to the second preferred embodiment shown in FIGS. 8A and 8B. Accordingly, the accuracy of luminance control is reduced by an amount corresponding to the infrared radiation detection result output from the extraneous light sensor 8.

Figure 11:
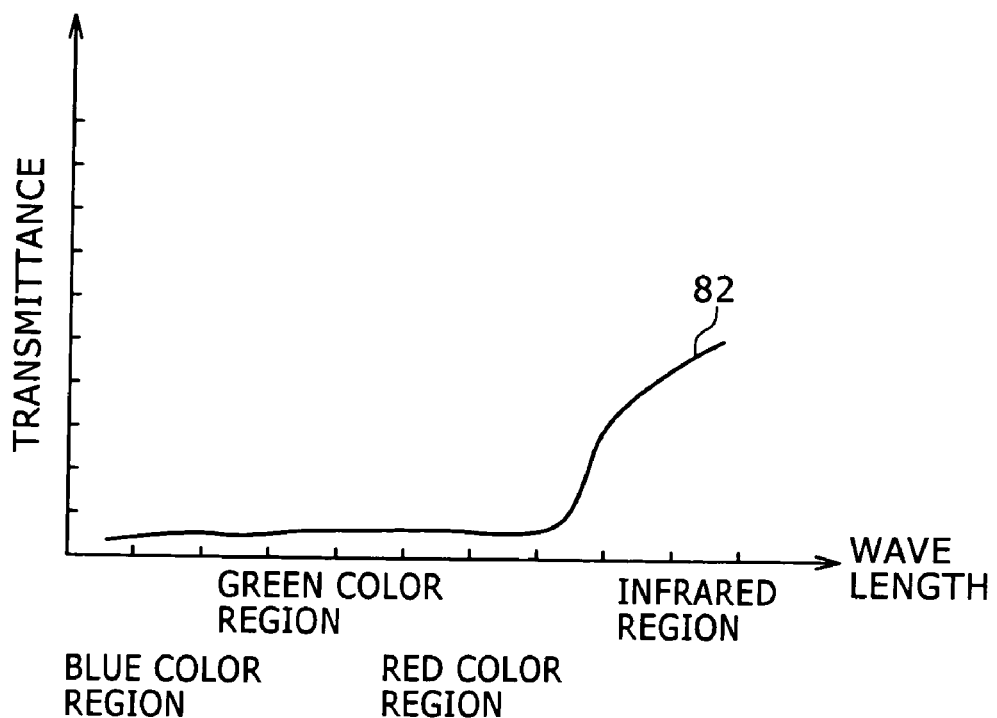
FIG. 11 is a graph showing the transmission characteristic of a filter for use with a correcting sensor in the third preferred embodiment.

In contrast to FIG. 10, FIG. 11 is a graph showing a characteristic curve of transmittance of the filter 82. As shown in FIG. 11, merely the wavelength band of infrared radiation is detected by the correcting sensor 8A by providing the filter 82. Accordingly, by subtracting the output signal from the correcting sensor 8A from the output signal from the extraneous light sensor 8, it is possible to obtain an output signal corresponding to the green wavelength band. Accordingly, a reduction in the accuracy of luminance control due to infrared radiation can be prevented, thereby further improving the accuracy of luminance control. The filter 82 may be prepared by laminating green and red color filters CFG and CFR.

According to this preferred embodiment, the wavelength band of infrared radiation can be detected by the correcting sensor, thereby further improving the accuracy of luminance control.

Fourth Preferred Embodiment

In contrast to FIGS. 8A and 8B, FIGS. 12, 13A, and 13B show a liquid crystal display panel 86 applied to a display device according to a fourth preferred embodiment of the present invention. FIGS. 13A and 13B are cross section taken along the lines C-C and B-B in FIG. 12, respectively. The display device according to the fourth preferred embodiment includes the liquid crystal display panel 86 in place of the liquid crystal display panel 71 shown in FIGS. 7A and 7B.

In the liquid crystal display panel 86, the correcting sensor 8A is located in the effective pixel area 2 at a position close to the extraneous light sensor 8. More specifically, the correcting sensor 8A is located in the reflective display area 12 of the green pixel where the extraneous light sensor 8 is located. As shown in FIG. 13A, a light shielding film 15A is formed on the glass substrate 9 under the correcting sensor 8A, and a light shielding member 15B is provided so as to fully cover the correcting sensor 8A.

In the liquid crystal display panel 86, variations in characteristics between the extraneous light sensor 8 and the correcting sensor 8A due to variations in manufacturing can be greatly reduced to thereby improve the accuracy of luminance control.

According to this preferred embodiment, the correcting sensor is located in the effective pixel area at a position close to the extraneous light sensor, thereby further improving the accuracy of luminance control.

Fifth Preferred Embodiment

In contrast to FIGS. 12, 13A, and 13B, FIGS. 14, 15A, and 15B show a liquid crystal display panel 91 applied to a display device according to a fifth preferred embodiment of the present invention. In the liquid crystal display panel 91, the configuration relating to the correcting sensor 8A is the same as that in the liquid crystal display panel 81 shown in FIGS. 9A and 9B. That is, the correcting sensor 8A in the liquid crystal display panel 91 is so configured as to detect merely the wavelength band of infrared radiation. Further, the configuration of the liquid crystal display panel 91 is the same as that of the liquid crystal display panel 86 according to the fourth preferred embodiment shown in FIGS. 12, 13A, and 13B except that the configuration relating to the correcting sensor 8A is different.

According to this preferred embodiment, the correcting sensor is located in the same pixel as that where the extraneous light sensor is located, and merely the wavelength band of infrared radiation is detected by the correcting sensor, thereby further improving the accuracy of luminance control.

Sixth Preferred Embodiment

Figure 12:
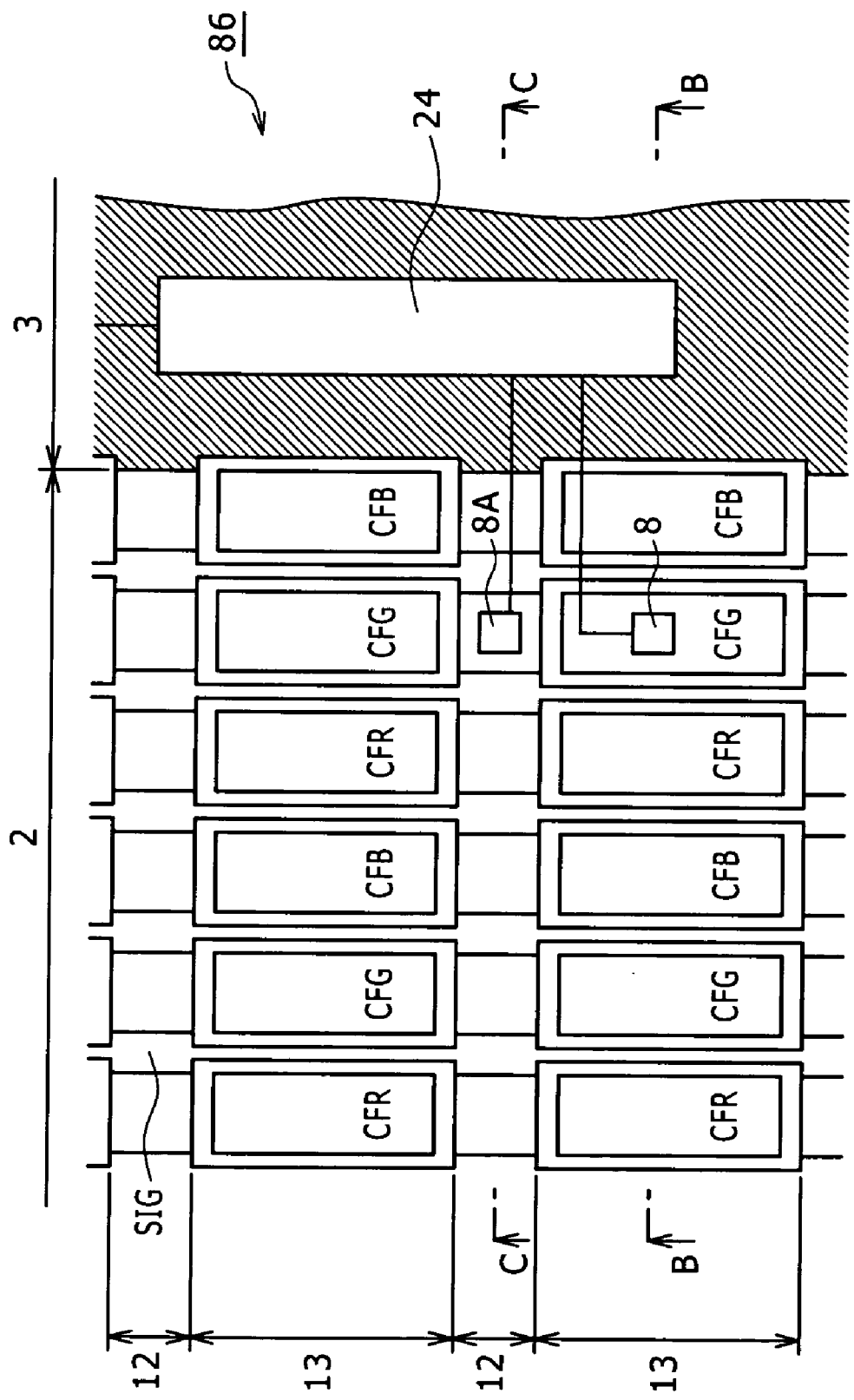
FIG. 12 is a plan view showing a liquid crystal display panel applied to a display device according to a fourth preferred embodiment of the present invention.
Figure 14:
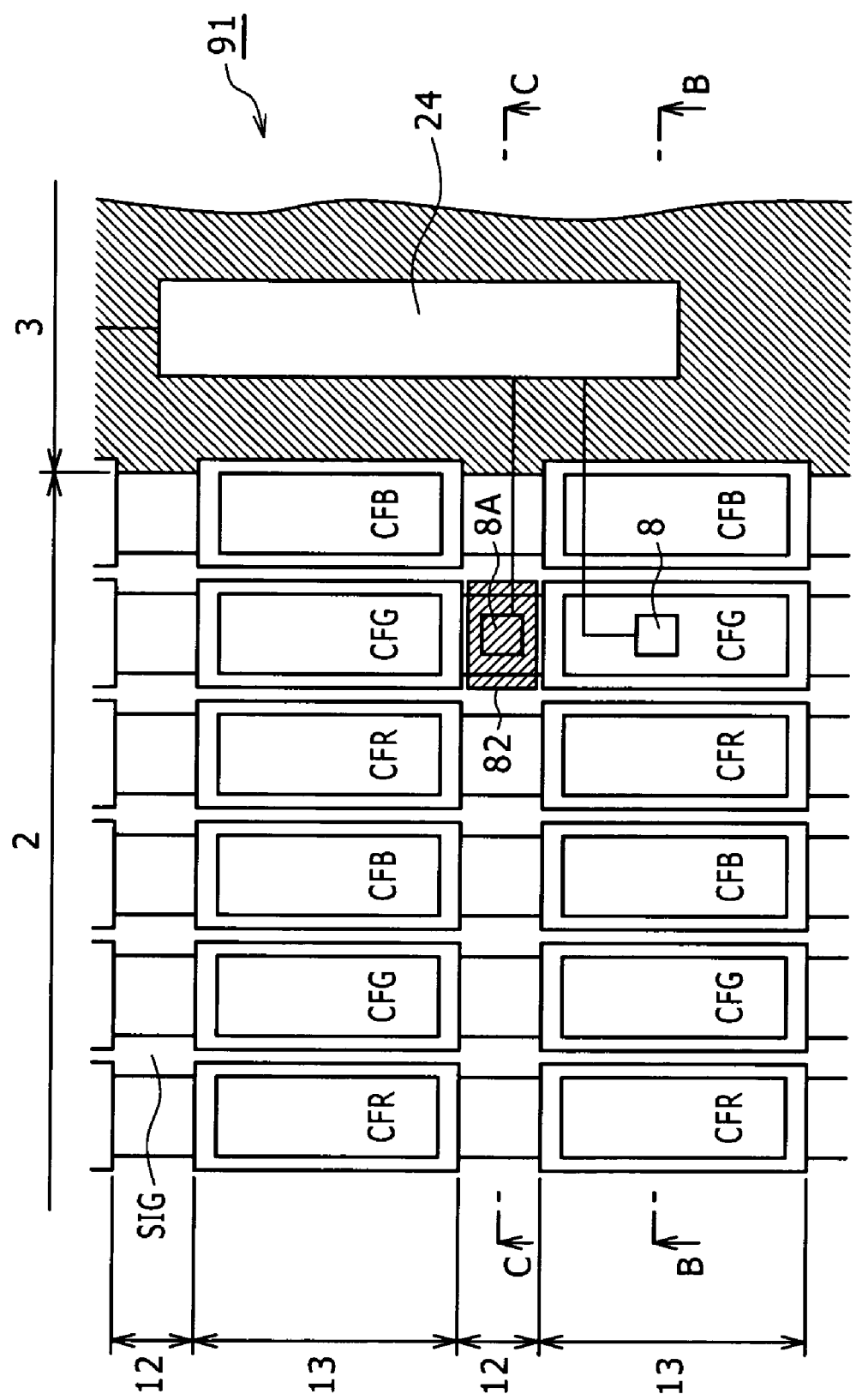
FIG. 14 is a plan view showing a liquid crystal display panel applied to a display device according to a fifth preferred embodiment of the present invention.
Figures 15A, 15B:
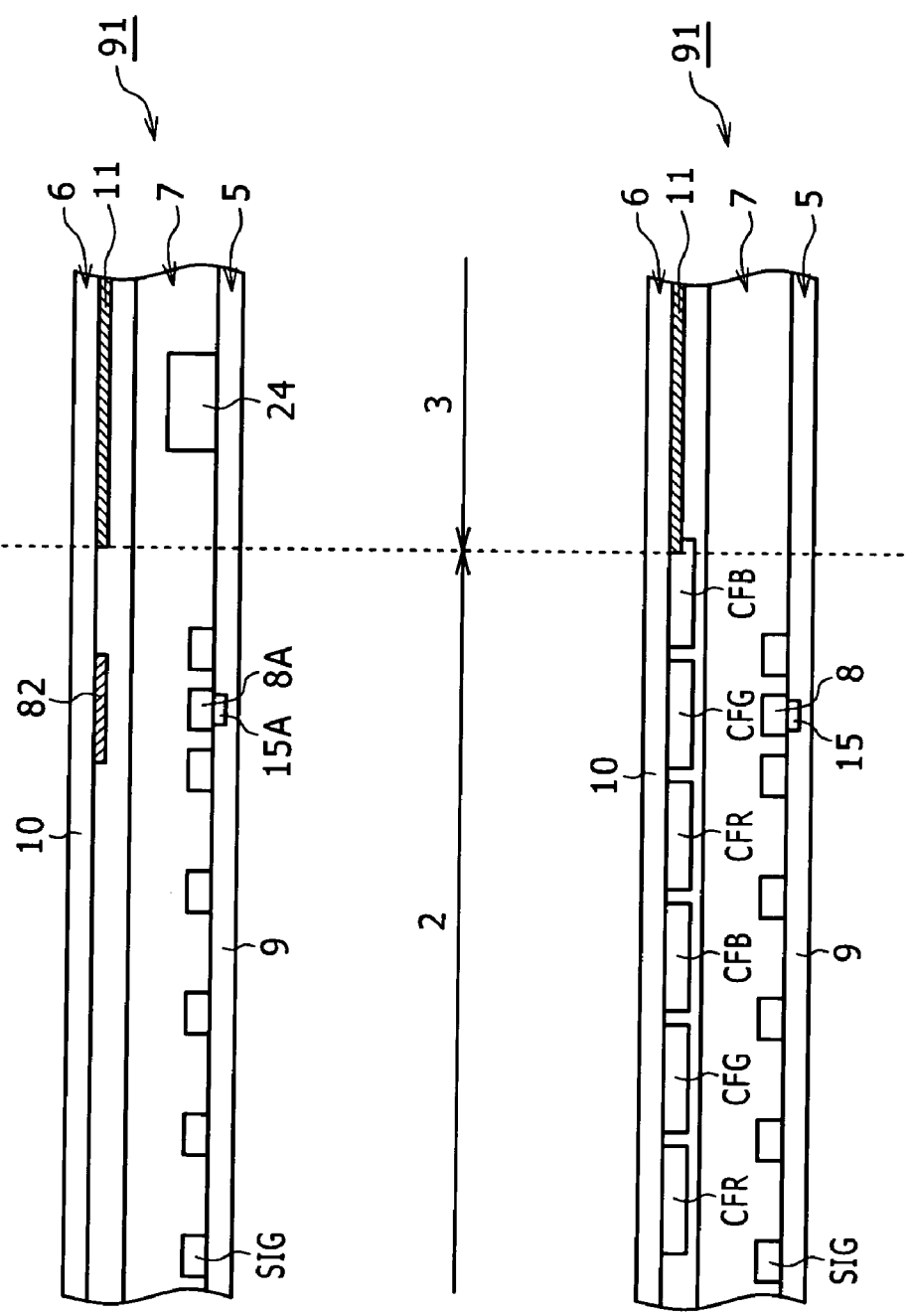
FIGS. 15A and 15B are sectional views of the liquid crystal display panel shown in FIG. 14.

In contrast to FIG. 12, FIG. 16 shows a liquid crystal display panel 96 applied to a display device according to a sixth preferred embodiment of the present invention. In the liquid crystal display panel 96, the correcting sensor 8A is located in a pixel vertically adjacent to the pixel where the extraneous light sensor 8 is located. The liquid crystal display panel 96 has the same configuration as that of the liquid crystal display panel 86 except the location of the correcting sensor 8A.

According to this preferred embodiment, the correcting sensor 8A is located in a pixel vertically adjacent to the pixel where the extraneous light sensor 8 is located, so that biased wiring due to the close locations of the extraneous light sensor 8 and the correcting sensor 8A can be reduced. Accordingly, even when the wiring space between the pixels closely arranged in the vertical direction is small, the extraneous light sensor 8 and the correcting sensor 8A can be sufficiently wired to obtain an effect similar to that of the liquid crystal display panel 86.

Seventh Preferred Embodiment

A liquid crystal display panel applied to a display device according to a seventh preferred embodiment of the present invention is similar to the liquid crystal display panel 96 according to the sixth preferred embodiment except that the configuration relating to the correcting sensor 8A in the liquid crystal display panel 91 according to the fifth preferred embodiment is adopted. That is, the correcting sensor in the liquid crystal display panel according to the seventh preferred embodiment detects merely the wavelength band of infrared radiation.

According to this preferred embodiment, the correcting sensor for detecting merely infrared radiation is located in a pixel vertically adjacent to the pixel where the extraneous light sensor is located, thereby improving the accuracy of luminance control and obtaining the same effect as that of the sixth preferred embodiment.

Eighth Preferred Embodiment

In the above preferred embodiments, the extraneous light sensor is located in a green pixel or both the extraneous light sensor and the correcting sensor are located in a green pixel. However, in the above preferred embodiments, the present invention is not limited to such configurations, but the extraneous light sensor or both the extraneous light sensor and the correcting sensor may be located in another color pixel provided that a practically sufficient accuracy of luminance control can be ensured.

Further, in the above preferred embodiments, the extraneous light sensor is located in a pixel in the effective pixel area. However, in the above preferred embodiments, the present invention is not limited to this configuration, but the extraneous light sensor may be located between pixels provided that a practically sufficient space for locating the extraneous light sensor can be ensured.

Further, in the above preferred embodiments, the present invention is applied to a semitransmissive liquid crystal display panel. However, in the above preferred embodiments, the present invention is not limited to this configuration, but it may be applied to a transmissive liquid crystal display panel and a reflective liquid crystal display panel.

Further, in the above preferred embodiments, the present invention is applied to a liquid crystal display panel. However, in the above preferred embodiments, the present invention is not limited to this configuration, but it may be widely applied to various self-emission type display panels such as an organic EL (electroluminescence) display panel. In this case, the luminance of light emitted from each pixel rather than the quantity of illumination light from the backlight unit is controlled, thereby controlling the luminance of the display screen.

It should be understood by those skilled in the art that various modifications, combinations, sub-combinations and alterations may occur depending on design requirements and other factor in so far as they are within the scope of the appended claims or the equivalents thereof.

What is claimed is:

1. A display device comprising:
    a first insulating substrate having a plurality of pixels, a sensor circuit and an extraneous light sensor disposed thereon, the first insulating substrate having a plurality of spaces arranged in a form of a matrix and constituting an effective pixel area with the extraneous light sensor disposed in one of the plurality of spaces and respective ones of the plurality of pixels disposed in remaining respective ones of the plurality of spaces; and
    a second insulating substrate disposed apart from and facially opposing the first insulating substrate and having a light-shielding region and a plurality of color filters arranged thereon in a matrix of rows and columns corresponding to and opposing the plurality of spaces, the plurality of color filters being a repetitive series of red, green and blue color filter elements in each row,
    wherein the light-shielding region surrounds the plurality of color filters, the sensor circuit and a portion of the light-shielding region facially oppose each other and the extraneous light sensor is disposed adjacent to and in electrical communication with the sensor circuit,
    wherein the portion of the light-shielding region facially opposing the sensor circuit is disposed adjacent to and extends along an end column of blue color filter elements;
    wherein respective ones of the green color filter elements are juxtaposed to respective ones of the blue color filter elements, and
    wherein the extraneous light sensor is disposed in a space that facially opposes one of the green color filter elements immediately next to one of the blue color filter elements in the end column.

2. The display device according to claim 1, further comprising:
    a luminance control circuit for controlling the luminance of said image according to said extraneous light quantity detection result.

3. The display device according to claim 2, wherein said luminance control circuit controls the quantity of light emitted from a primary light source in a backlight unit for supplying illumination light to said effective pixel area, so as to control the luminance of said image.

4. The display device according to claim 1, further comprising:
    a correcting sensor for detecting dark current in said extraneous light sensor to output a correcting detection result for correction of said extraneous light quantity detection result.

5. The display device according to claim 4, wherein said correcting sensor is located in the same space as that where said extraneous light sensor is located.

6. The display device according to claim 4, wherein said correcting sensor is located in the space adjacent to the space where said extraneous light sensor is located.

7. The display device according to claim 4, further comprising:
    a filter for passing infrared radiation, wherein
    said correcting sensor detects extraneous light through one of the color filters.

8. The display device according to claim 7, wherein said correcting sensor is located in the same space as that where said extraneous light sensor is located.

9. The display device according to claim 7, wherein said correcting sensor is located in the space adjacent to the space where said extraneous light sensor is located.

* * * * *